United States Patent
Amourah

(10) Patent No.: US 8,837,657 B1
(45) Date of Patent: Sep. 16, 2014

(54) MULTI-PHASE SAMPLING CIRCUITS AND METHODS

(71) Applicant: Cypress Semiconductor Corporation, San Jose, CA (US)

(72) Inventor: Mezyad Amourah, Milpitas, CA (US)

(73) Assignee: Cypress Semiconductor Corporation, San Jose, CA (US)

( * ) Notice: Subject to any disclaimer, the term of this patent is extended or adjusted under 35 U.S.C. 154(b) by 8 days.

(21) Appl. No.: 13/628,307

(22) Filed: Sep. 27, 2012

Related U.S. Application Data

(60) Provisional application No. 61/672,894, filed on Jul. 18, 2012.

(51) Int. Cl.
*H04L 7/00* (2006.01)

(52) U.S. Cl.
USPC ........... 375/355; 375/354; 375/360; 375/376; 375/343; 375/340

(58) Field of Classification Search
CPC ..... H04L 7/033; H04L 7/0337; H04L 1/0054; H04L 25/062
USPC .......... 375/355, 354, 360, 376, 343, 340, 316
See application file for complete search history.

(56) References Cited

U.S. PATENT DOCUMENTS

| | | | |
|---|---|---|---|
| 4,899,273 A * | 2/1990 | Omoda et al. .................. | 703/14 |
| 5,844,436 A | 12/1998 | Altmann | |
| 6,813,108 B2 | 11/2004 | Annampedu et al. | |
| 7,301,996 B1 | 11/2007 | Chi et al. | |
| 8,181,058 B2 | 5/2012 | Su et al. | |
| 8,229,706 B2 | 7/2012 | Kawabata et al. | |
| 2003/0142770 A1* | 7/2003 | Engl et al. .................. | 375/355 |
| 2003/0234642 A1* | 12/2003 | Clegg et al. .................. | 324/115 |
| 2006/0188046 A1* | 8/2006 | Jain .............................. | 375/355 |
| 2007/0009066 A1* | 1/2007 | Fredriksson .................. | 375/326 |

FOREIGN PATENT DOCUMENTS

JP 61071499 A 4/1986

OTHER PUBLICATIONS

Espacenet, Bibliographic data including English Abstract for JP61071499.
National Semiconductor Corporation, Generating Precision Clocks for Time-Interleaved ADCs, Signal Path Designer, 2007.
Tektronix, Inc., Oscilloscope Fundamentals, 2009.
IEEE, citation to Psiaki et al, "Real-time generation of bit-wise parallel representations of over sampled PRN codes", Wireless Communications, IEEE, vol. 5, Issue 3, Mar. 2006, pp. 487-491, IEEE Xplore Digital Library, found on Internet at http://www.ieee.org.

* cited by examiner

*Primary Examiner* — Sam K Ahn
*Assistant Examiner* — Fabricio R Murillo Garcia

(57) ABSTRACT

A circuit can include an input section configured to store a data signal in response to phase shifted clocks to generate a plurality of sample values; an output section configured to store one of the sample values; and a logic section configured to selectively output one of the sample values to the output section in response to the sample values and a previous sampled value stored in the output section.

17 Claims, 9 Drawing Sheets

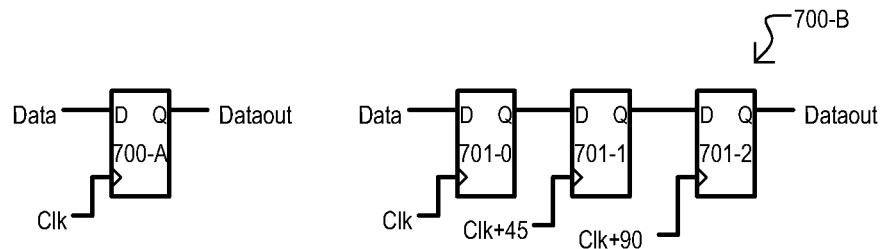
FIG. 7A
(RELATED ART)
FIG. 7B
(RELATED ART)
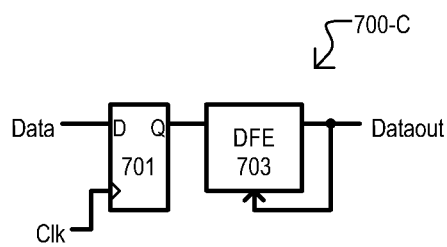
FIG. 7C
(RELATED ART)
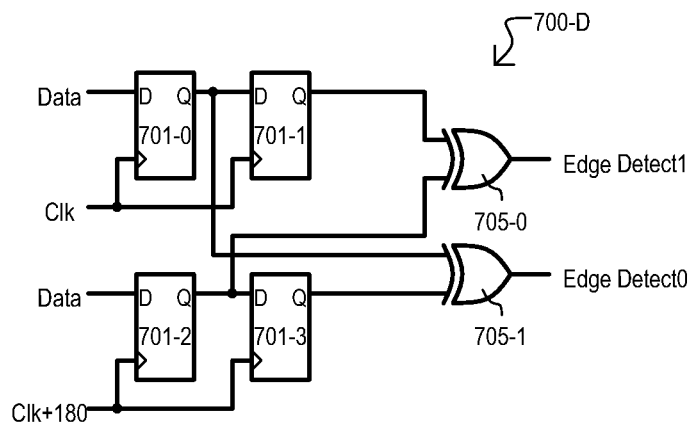
FIG. 7D
(RELATED ART)

MULTI-PHASE SAMPLING CIRCUITS AND METHODS

RELATED APPLICATIONS

This application claims priority to U.S. Patent Application No. 61/672,894, filed Jul. 18, 2012, which application is hereby incorporated by reference in its entirety.

TECHNICAL FIELD

The present disclosure relates generally to data input circuits, and more particularly to data sampling circuits that determine a data value according to a timing signal, such as a clock.

BACKGROUND

Conventional data sampling circuits can capture a data input value in response to a clock signal (such as a rising or falling edge of a clock signal). One conventional data sampling circuit 700-A is shown in FIG. 7A. A data sampling circuit 700-A can be a D-type flip-flop (FF), latching a data value (Data) on a rising edge of clock signal (Clk). While such conventional sampling can provide adequate results at slower data speeds (i.e., less than 1 GHz), at higher speeds jitter, skew and pulse narrowing (which can occur from inter-symbol interference (ISI)) can result in incorrect sampling, leading to an erroneous output value (Dataout).

A single D-type FF sampling circuit, like that of FIG. 7A can suffer from metastability, particularly if set-up and hold times are violated. Another conventional data sampling circuit 700-B, shown in FIG. 7B, can be used to address metastability problems. Data sampling circuit 700-B can include D-type FFs 701-0 to -2 arranged in series with one another. FF 701-0 can sample a data value according to a clock signal (Clk). FF 701-1 can re-sample the output of FF 701-0 with a clock that is phase delayed by 45° with respect the clock signal (Clk). FF 701-2 can re-sample the output of FF 701-1 with a clock that is phase delayed by 90° with respect the clock signal (Clk). While data sampling circuit 700-B can address metastability problems, it can still yield erroneous values in response to jitter, skew and pulse narrowing.

Another conventional data sampling circuit 700-C is shown in FIG. 7C. Data sampling circuit 700-C can include a conventional D-type FF stage 701, followed by a decision feedback equalization (DFE) circuit 703, which can alter a sampling process based on a previously detected value. While DFE-type sampling circuit 700-C can provide high speed operations, and can remove effects of ISI, it can remain vulnerable to jitter and skew effects.

FIG. 7D shows a conventional transition detection circuit 700-D. Transition detection circuit can include serial connected D-type FFs 701-0/1, 701-2/3, and XOR gates 705-0/1. FFs 701-0/1 can be clocked by a clock signal (01k). An output of FF 701-0 can be provided as a first input to an XOR gate 705-0, while an output of FF 701-1 can be provided as a first input to XOR gate 705-1. FFs 701-2/3 can be clocked by a clock signal that is phase shifted by 180° with respect to signal Clk. Outputs of XOR gates 705-0/1 can indicate the location of a data transition. It is noted that data transition detection circuit 700-D is not used for data capture.

BRIEF DESCRIPTION OF THE DRAWINGS

FIGS. 7A to 7D are block schematic diagrams of conventional circuits.

DETAILED DESCRIPTION

Figure 1A:
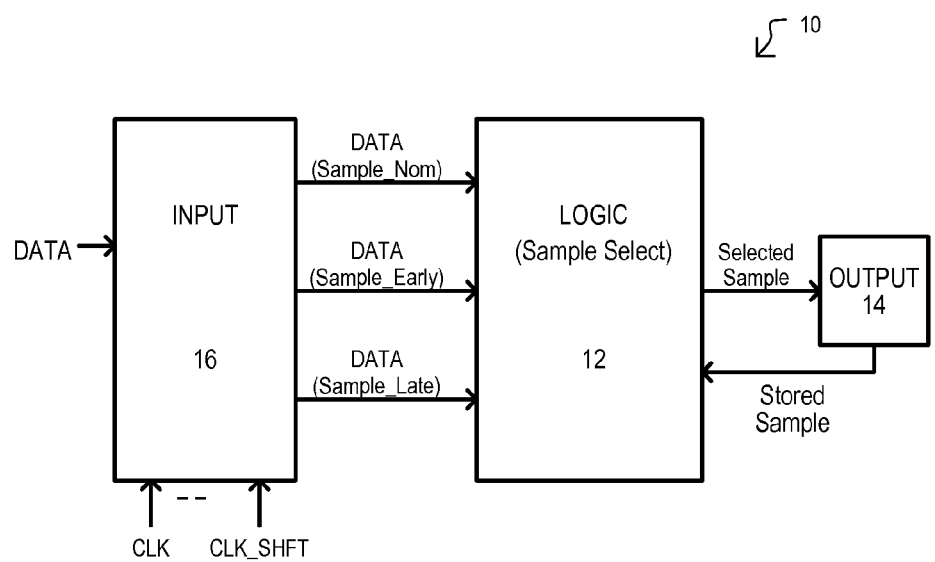
FIGS. 1A to 1C are a timing diagram and block schematic diagrams showing sampling circuits and sampling operations according to embodiments.

Various embodiments will now be described that show data sampling circuits and methods that sample a same data value with multiple phases of a same sampling clock. A final data value can be determined by comparing samples of different phases with a previously sampled value. Phase differences between sample clocks can be selected according to anticipated jitter and skew.

In the embodiments below, like items are referred to by the same reference characters but with the leading digit(s) corresponding to the figure number.

FIG. 1A is a block schematic diagram showing a data storing circuit 10 according to an embodiment. A data storing circuit 10 can include an input section 16, a logic section 12 and an output section 14. An input section 16 can receive a data value (DATA) and store multiple determinations of the data value taken within a time window. In some embodiments, such determinations can be made according to multiple clock signals (CLK, CLK_SHFT) that are phase shifted with respect to one another. Data value determinations made by input section 16 can correspond to different sample time periods. In FIG. 1A, input section 16 can provide data value determinations as sample values "Sample_Nom", "Sample_Early", and "Sample_Late". Sample_Early can correspond to a time period before Sample_Nom. Sample_Late can correspond to a time period after Sample_Nom.

Logic section 12 can output one of the data value determinations "Sample_Nom", "Sample_Early", and "Sample_Late") to output section 14 based on the data value determinations themselves, along with a previous data value stored in output section 14.

Figure 1B:
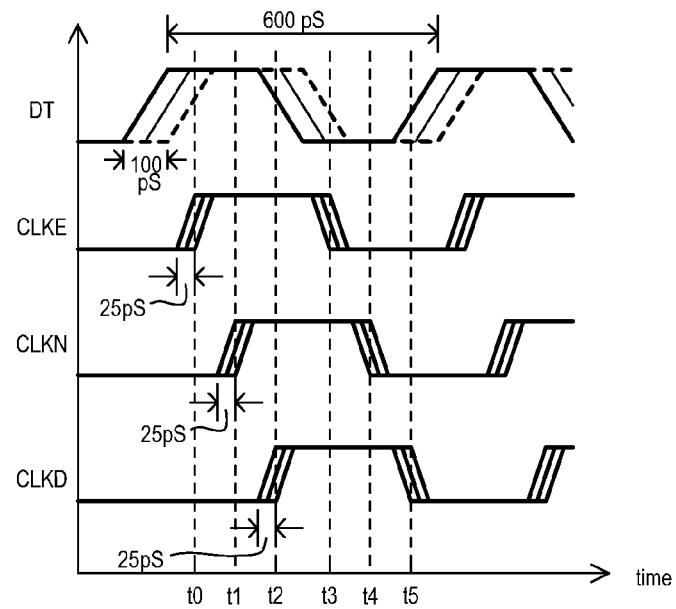
Figure 1C:
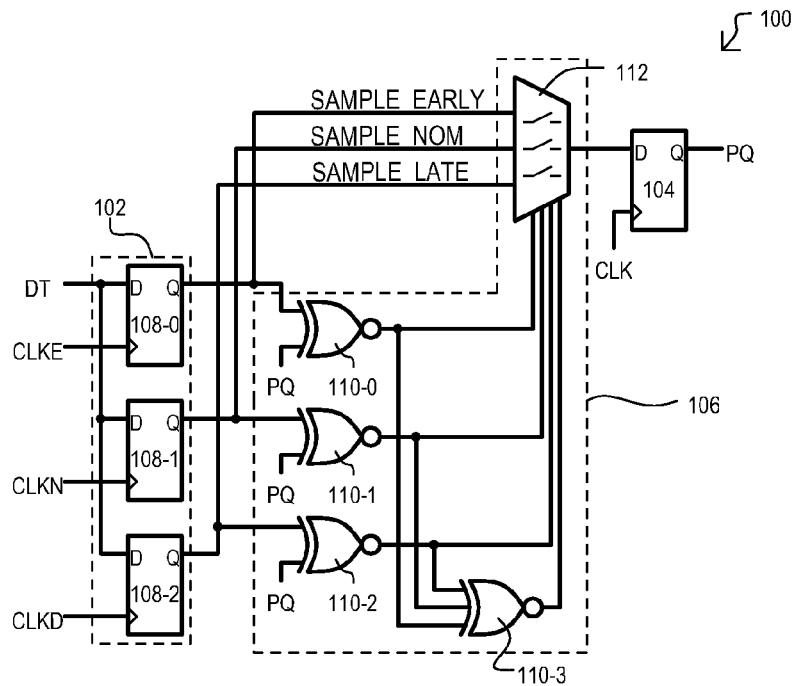

FIGS. 1B and 1C show a sampling circuit and method according to another embodiment. FIG. 1B is a timing diagram showing a sampling operation. FIG. 1C is a block schematic diagram of a corresponding sampling circuit 100.

Referring to FIG. 1C, a sampling circuit 100 can include an input latching section 102, an output latch section 104, and a logic section 106. An input latching section 102 can latch an input data signal (DT) with different phases to generate multiple samples of the same data value (DT).

In the embodiment shown, three sample results can be generated: SAMPLE_EARLY, SAMPLE_NOM, and SAMPLE_LATE. A SAMPLE_NOM value can correspond to a sample taken at a nominal sample time. A SAMPLE_EARLY value can correspond to a sample taken prior to the nominal sample time. A SAMPLE_LATE value can correspond to a sample taken after the nominal sample time. Such multiple sample times can effectively widen a sample window.

In some embodiments, an input latching section 102 can include a number of latching circuits that each latches the sampled data values with different phase shifts. In the very particular embodiment of FIG. 1C, an input latching section 102 can include three D-type flip-flop (FF) circuits 108-0 to 108-2. Each FF (108-0 to 108-2) can receive the same data value (DT) at a "D" input. FF 108-1 can receive a nominal clock (CLKN) at a clock input, which can have a sampling edge aligned with a best expected sampling point of the data value. For example, given the range of jitter and skew, where the data value is least affected by the jitter/skew (e.g., center of an eye diagram). FF 108-0 can receive an early clock (CLKE) at a clock input, which can have a negative phase shift with respect to the nominal clock (CLKN). Thus, FF 108-0 can sample a data value before the nominal point. FF 108-2 can receive a delayed clock (CLKD) at a clock input, which can have a positive shift with respect to the nominal clock (CLKN). Thus, FF 108-2 can sample a data value after the nominal point.

FIG. 1B is a timing diagram illustrating a sampling operation like that of input latching circuit 102, according to an embodiment. FIG. 1B shows a data value DT, and sample clocks CLKE, CLKN, CLKD. In the embodiment shown, it is assumed a sampling operation occurs on at least a rising edge of each sample clock (CLKE, CLKN, CLKD). Waveform DT shows how a data value DT can vary according to jitter/skew. In the particular embodiment shown, data can have a double data rate, thus two data values transmitted over a 600 ps time period. The data values can suffer from up to 100 ps of jitter.

As shown, nominal clock (CLKN) can have a rising edge at about time t1, where jitter/skew have the least effect on the data value. In contrast, early clock (CLKE) can have a rising edge at time t0, prior to time t1. Delayed clock (CLKD) can have a rising edge at time t1, after time t1. In the embodiment shown, the sample clocks (CLKE, CLKN, CLKD) themselves can have some jitter (i.e., 25 ps). In some embodiments, temperature compensated circuits can be used to ensure sample clock phase difference remains substantially temperature insensitive.

While sampling can occur on rising edges of sample clocks (CLKE, CLKN, CLKD), sampling can also occur on falling edges of such clocks, as shown at times t3, t4 and t5.

Referring back to FIG. 1C, within data sampling circuit 100, logic section 106 can selectively output one of the sampled values (SAMPLE_EARLY/NOM/LATE) by comparing sampled values to a previous sampled value. In embodiment shown, if an early sample value (SAMPLE_EARLY) differs from a previously latched value (i.e., the data value previously determined by the sampling circuit), a data transition has been detected, and the early sample value can be the finalized value.

However, if the early sample value (SAMPLE_EARLY) is the same as the previously latched value, the nominal sample value (SAMPLE_NOM) can be compared to the previously latched data value. If the nominal sample value is different than the previously latched value, a data transition (occurring after the early sample point) has been detected, and the nominal sample value can be the finalized value.

If the early and nominal sample values are the same as the previously latched value, the late sample value (SAMPLE_LATE) can be compared to the previously latched data value. If the late sample value is different than previously latched value, the late sample value (SAMPLE_LATE) can be the finalized value.

If none of the sampled values (SAMPLE_EARLY/NOM/LATE) are different than the previously latched value, it is assumed the newly arrived data value matches the previously latched data value.

In the very particular embodiment of FIG. 1C, logic section 106 can include XNOR circuits 110-0 to -3 and multiplexer (MUX) 112. Each XNOR circuit (110-0 to -2) can have one input connected to receive a corresponding sample value (SAMPLE_EARLY/NOM/LATE), another input connected to receive the previously latched data value PQ, and an output connected to a control input of MUX 112. In operation, when an XNOR circuit (110-0 to -2) detects a difference between its sampled value and the previously latched value (PG), it can gate its sampled value through MUX 112. That is, upon detecting a difference, XNOR 110-0 can gate SAMPLE_EARLY, XNOR 110-0 can gate SAMPLE_NOM, and XNOR 110-2 can gate SAMPLE_LATE.

The inputs of XNOR 110-3 can be connected to the outputs of XNORs 110-0 to -2. In one embodiment, a MUX 112 can be enabled by an output from XNOR 110-3. Thus, if any transition is detected by the other XNORs (XNOR 110-0 to -2), MUX 112 can be enabled to pass the corresponding sample value. If no transitions are detected by XNOR 110-3, MUX 112 can be disabled, as the sampled data value (DT) is assumed to be same as the previously latched data value (PG). Alternatively, if no transitions are detected by XNOR 110-3, MUX 112 can pass late sample value (SAMPLE_LATE).

An output section 104 can include a D-type FF having a data input (D) connected to an output of MUX 112, a clock input connected to receive a clock signal CLK, and a data output that provides the previously latched data value (PG).

Figure 2A:
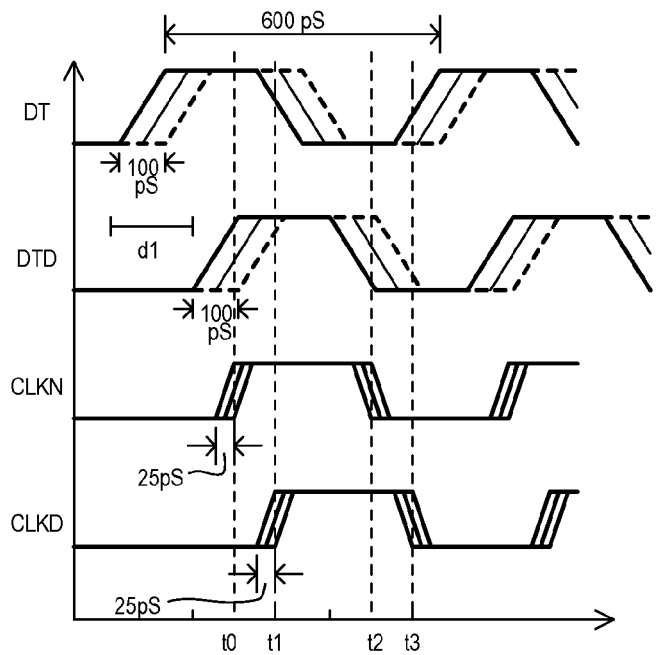
FIGS. 2A and 2B are a timing diagram and block schematic diagram showing a sampling circuit and sampling operations according to additional embodiments.
Figure 2B:
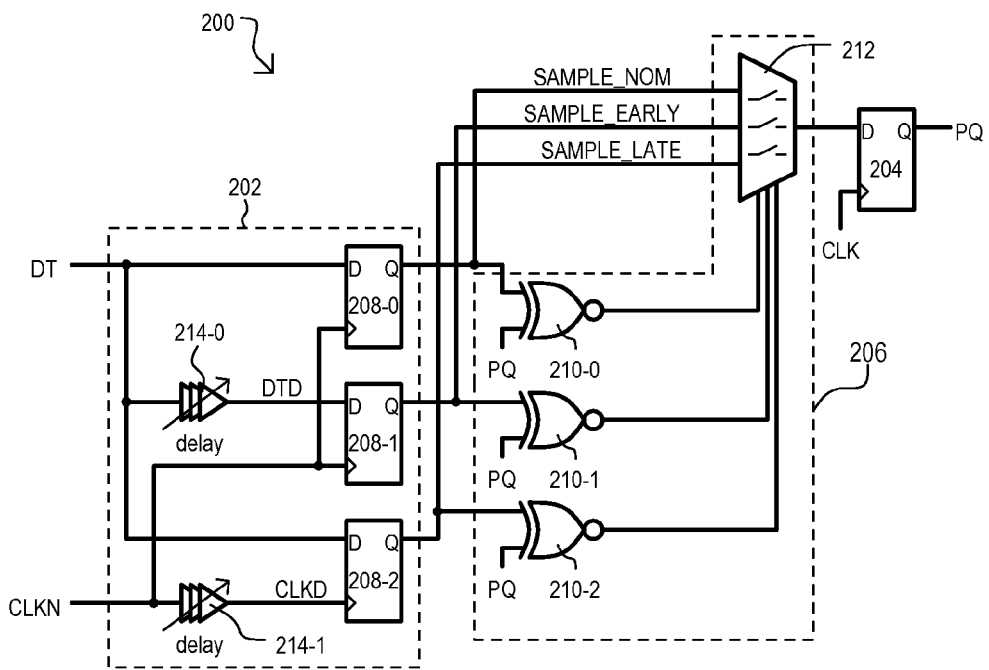

FIGS. 2A and 2B show a sampling circuit and method according to another embodiment. FIG. 2A is a timing diagram showing a sampling operation. FIG. 2B is a block schematic diagram of a corresponding sampling circuit 200. Sampling circuit 200 can be simpler and less expensive to implement than that shown in FIGS. 1B and 1C.

Referring to FIG. 2B, like sampling circuit 100, sampling circuit 200 can include an input latching section 202, an output latch section 204, and a logic section 206. Like the embodiment of FIG. 1C, an input latching section 102 can latch an input data signal (DT) with different phases to generate multiple samples of the same data value (DT) to generate three sample results: SAMPLE_EARLY, SAMPLE_NOM, and SAMPLE_LATE.

However, unlike the embodiment of FIGS. 1B/C, an early sample value (SAMPLE_EARLY) is not acquired with a clock signal having a negative phase shift, but with a nominal clock signal that samples a delayed data value.

In the very particular embodiment of FIG. 2B, an input latching section 202 can include three D-type FF circuits 208-0 to 208-2 and two delay circuits 214-0/1. As shown, input latching section 202 can receive the data value (DT) and a nominal clock value (CLKN). This is in contrast to the input latching section 102 of FIG. 1C, which can receive three different clocks (CLKN, CLKE, CLKD).

FFs 208-0 and 208-2 can receive the same data value (DT) at "D" inputs. Further, FF 208-0 can receive a nominal clock (CLKN) at a clock input and thus operate in the same essential fashion as FF 108-1 of FIG. 1C (i.e., generate a SAMPLE_NOM value). A delayed clock (CLKD) can be generated by applying nominal clock (CLKN) to delay circuit 214-1. FF 208-2 can receive the delayed clock (CLKD) at a clock input, and thus operate in the same essential fashion as FF 108-2 of FIG. 1C (i.e., generate a SAMPLE_LATE value).

A delayed data value (DTD) can be generated by applying nominal clock (CLKN) to delay circuit 214-0. FF 208-1 can receive the delayed data value (DTD) at a "D" input and a nominal clock (CLKN) at a clock input. As a result, nominal clock (CLKN) can have a negative phase shift with respect to the delayed data value (DTD). Thus, FF 208-1 can sample a data value before the nominal point, and thus generate an early data sample (SAMPLE_EARLY').

FIG. 2A is a timing diagram illustrating a sampling operation like that of input latching circuit 202, according to an embodiment. FIG. 2A shows a data value DT, a delayed data value DTD, and sample clocks CLKN and CLKD. Waveform DT shows a same jitter/skew variation as DT shown in FIG. 1B. Waveform DTD can be essentially the same as DT, but delayed by an amount dl.

As shown, nominal clock (CLKN) can have a rising edge at about time t0, sampling DT at a nominal point, as in the embodiment of FIG. 1B. However, such a sampling point with respect to DTD can be an early sampling point. Delayed clock (CLKD) can sample in the same fashion as FIG. 1B, sampling at about time t1. Sampling can also occur on falling edges of such clocks, as shown at times t2 and t3.

Referring back to FIG. 2B, logic section 206 can include XNOR circuits 210-0 to -2 and a MUX 212. XNOR circuits 210-0 to -2 can operate in the same essential fashion as described for FIG. 1C, gating their respective sampled value (SAMPLE_EARLY/NOM/LATE) if it differs from the previously latched value (PQ). However, unlike FIG. 1C, logic section 206 does not include an XNOR circuit 210-3. In one very particular embodiment, if no transitions are detected by XNORs 210-0 to -2, MUX 212 can be disabled, and the sampled data value (DT) can be assumed to be same as the previously latched data value (PG). Alternatively, if no transitions are detected MUX 212 can pass late sample value (SAMPLE_LATE).

An output section 204 can include a D-type FF as in FIG. 1C.

Figure 3:
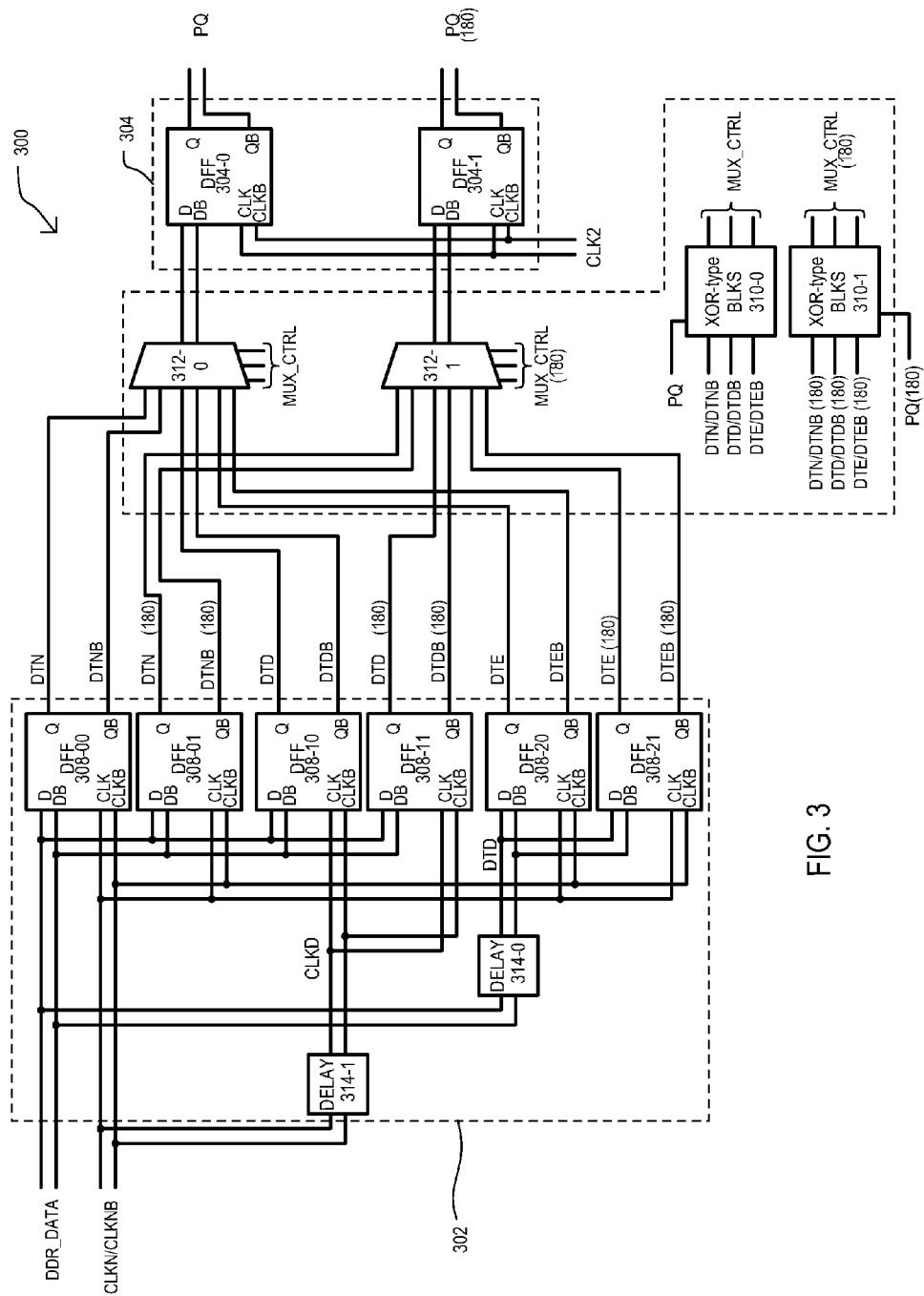
FIG. 3 is a block schematic diagram of a sampling circuit according to a further embodiment.

FIG. 3 is a block schematic diagram of a sampling circuit 300 according to a further embodiment. Sampling circuit 300 can sample data at a double data rate, and sense data with differential circuits. Sampling circuit 300 can include an input latching section 302, an output latch section 304, and a logic section 306.

Input latching section 302 can include a data delay circuit 314-0, clock delay circuit 314-1, and differential D-type FFs 308-00 to -21. Differential double data rate (DDR) data values (DDR_DATA) can be delayed by data delay circuit 314-0 to generate delayed DDR data values (DTD). A nominal clock (CLKN) in complementary form (i.e., CLKN/CLKNB) can be delayed by clock delay circuit 314-1 to generate complementary delayed clock signals (CLKD).

FFs 308-00, -01, -10 and -11 can receive differential DDR values (DDR_DATA) at data inputs D/DB. FFs 308-20/21 can receive delayed DDR data values (DTD) at data inputs D/DB. FFs 308-00, -01, -20 and -21 can receive nominal clock signals CLKN at clock inputs, and FFs 308-10/11 can receive delayed clock signals (CLKD) at clock inputs. Accordingly, as understood from FIGS. 2A/B, FFs 308-00/01 can provide nominal sample values (DTN/DTNB), FFs 308-01/11 can provide delayed sample values (DTD/DTDB), and FFS 308-20/21 can provide early sample values (DTE/DTEB).

Logic section 306 can include MUXs 312-0/1 and compare blocks 310-0/1. Compare blocks 310-0/1 can compare sample values with corresponding previously latched values to provide control signals to MUXS 312-0/1. MUXs 312-0/1 can selectively pass one sample value to output latch section 304 according to control signals from compare blocks 310-0/1. In one particular embodiment, compare blocks 310-0/1 and MUXs 312-0/1 can operate as follows: If an early sample (DTE/DTEB) is different than a previous sample (PQ), the early sample can be output as a final value. If an early sample is the same as the previous sample, the nominal sample (DTN/DTNB) can be compared to the previous sample (PQ). If the nominal sample is different than the previous sample, the nominal sample can be output as a final value. If the early and nominal samples are the same as the previous sample, the late sample (DTD/DTDB) can be output as the final value. Final values can be output as differential values.

An output section latch section 304 can include output differential D-type FFs 304-0/1. FF 304-0 can latch an output value from MUX 312-0, and feedback a latched value (PQ) to compare block 310-0. FF 304-1 can latch an output value from MUX 312-1, and feedback its latched value (PQ 180) to compare block 310-1.

Figure 4A:
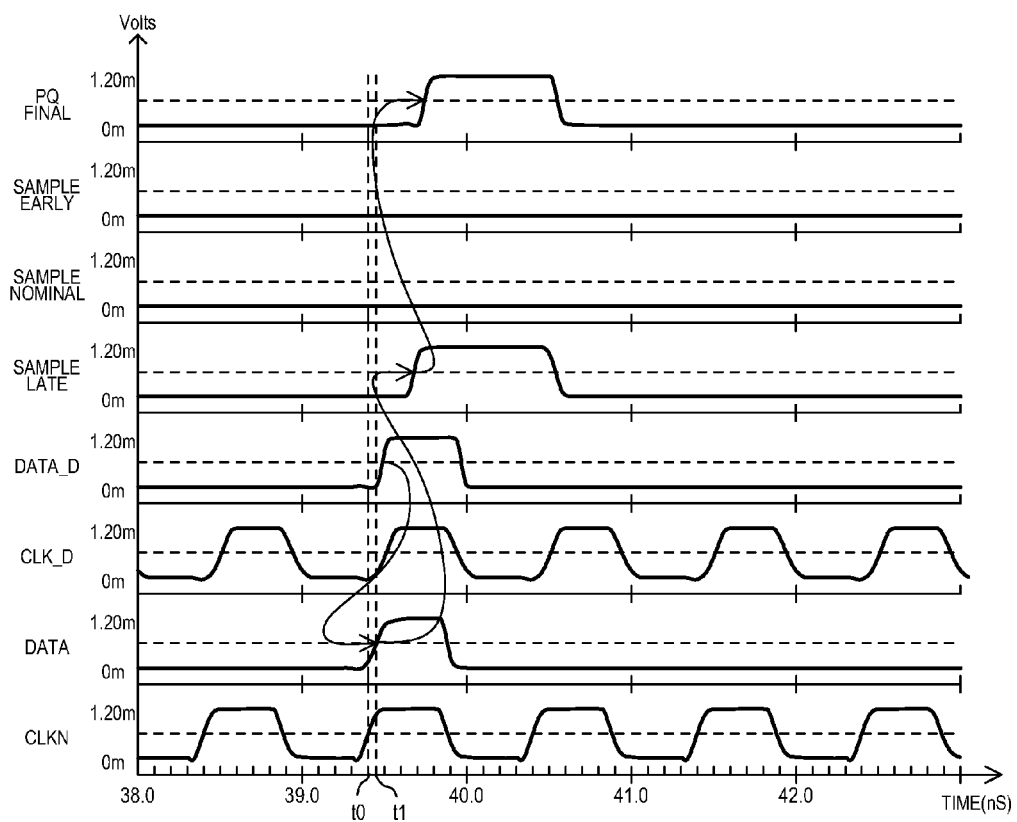
FIGS. 4A and 4B are timing diagrams showing sampling operations for a circuit like that of FIG. 3.

FIG. 4A is a timing diagram showing a data sampling operation for a sampling circuit like that shown in FIG. 3. FIG. 4A includes the following waveforms: PQ FINAL, which shows a final determined data value; SAMPLE_LATE, which shows a late sample value; SAMPLE NOMINAL, which shows a nominal sample value; SAMPLE_EARLY, which shows an early sample value; DATA_D, which shows a delayed data value, CLK_D which shows a delayed clock signal; DATA, which shows a data value; and CLKN, which shows a nominal clock value.

FIG. 4A shows a sampling case with a negative set-up time. A data value can be narrowed (i.e., by channel attenuation for example) resulting in a rising edge of DATA (at time t0) that appears after the rising edge of CLKN (at time t1). Consequently, the nominal sample (SAMPLE NOMINAL) fails to detect the data. Similarly, the rising edge of the delayed data value DATA_D occurs after the edge of CLKN, thus the early sample (SAMPLE_EARLY) fails to detect the data. However, the rising edge of the delayed CLK_D occurs after the rising edge of DATA, thus the late sample (SAMPLE LATE) detects the data, and is stored as the final latched value PQ.

Figure 4B:
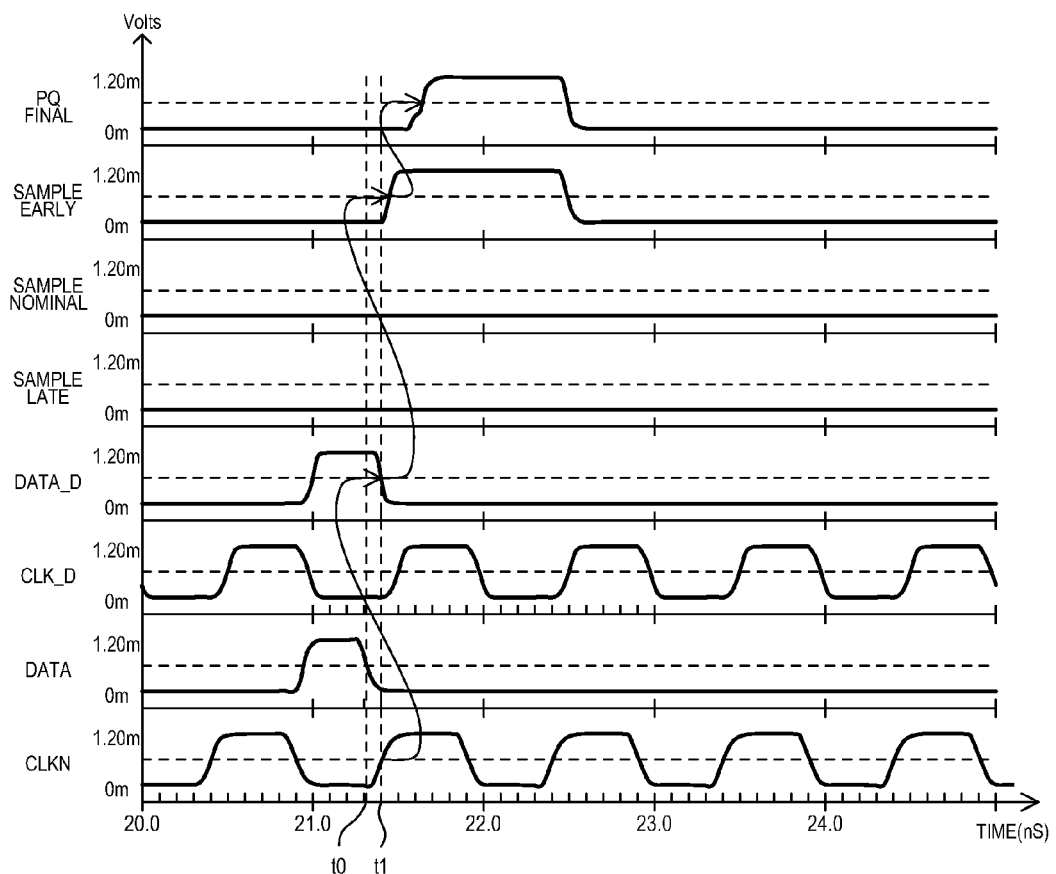

FIG. 4B is a timing diagram showing another data sampling operation for a sampling circuit like that shown in FIG. 3. FIG. 4B includes the same waveforms as FIG. 4A.

FIG. 4B shows a sampling case with a negative hold time. A data value (DATA) can transition low (at time t0) before a rising edge of CLKN (at time t1). Consequently, the nominal sample (SAMPLE NOMINAL) fails to detect the data. Similarly, the rising edge of the delayed clock CLK_D occurs after DATA goes low, and the late sample (SAMPLE LATE) also fails to detect the data. However, the rising edge of the nominal clock CLKN occurs before the delayed data value DATA_D transitions low, thus the early sample (SAMPLE EARLY) detects the data, and is stored as the final latched value PQ.

While the above embodiments have shown various data sampling circuits and methods, an additional method embodiment will now be described with reference to a flow diagram.

Figure 5:
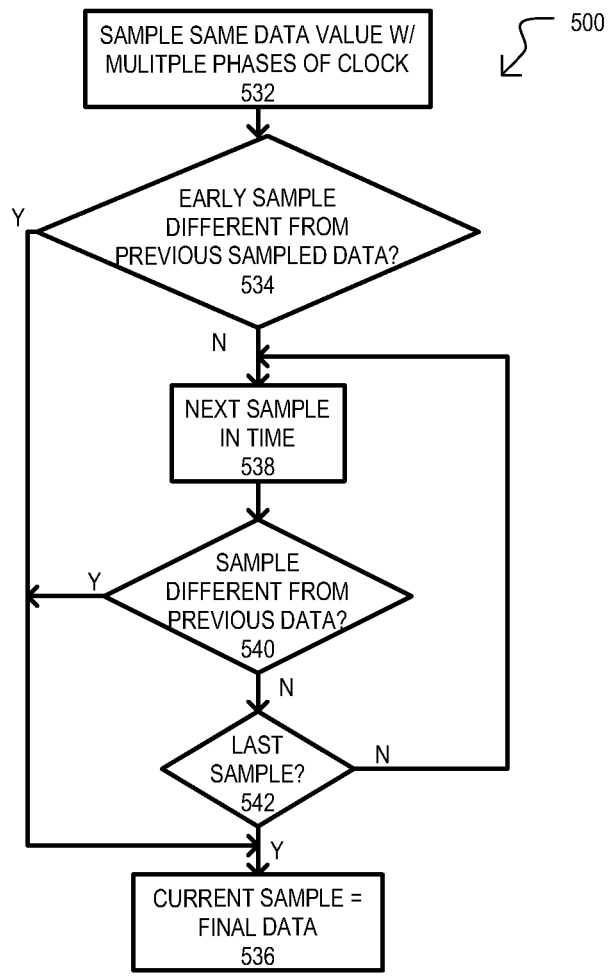
FIG. 5 is a flow diagram of a method according to an embodiment.

FIG. 5 is a flow diagram of a method 500 according to an embodiment. A method 500 can include sampling a same data value with multiple phases of a clock 532. Such an action can include sampling with a clock for each phase, or sampling a delayed data value for a negative phase shift sample. A method 500 can also include determining if an early sample is different from previously sampled data 534. If an early sample is different from previous data (Y from 534), the early sample value can be determined to be the final data 536. If an early sample is not different from previous data (N from 534), a method can switch to a next sample in time 538.

The current sample can be compared to previously sampled data 540. If the current early sample is different from previous data (Y from 540), the current sample value can be determined to be the final data 536. If the current sample is not different from previous data (N from 540), a method can determine if a last sample has been reached 542. If a last sample has not been reached (N from 542), a method can return to 538 and a next sample can be compared. If a last sample has been reached (Y from 542), the last sample can be determined to be the final data 536.

Figure 6:
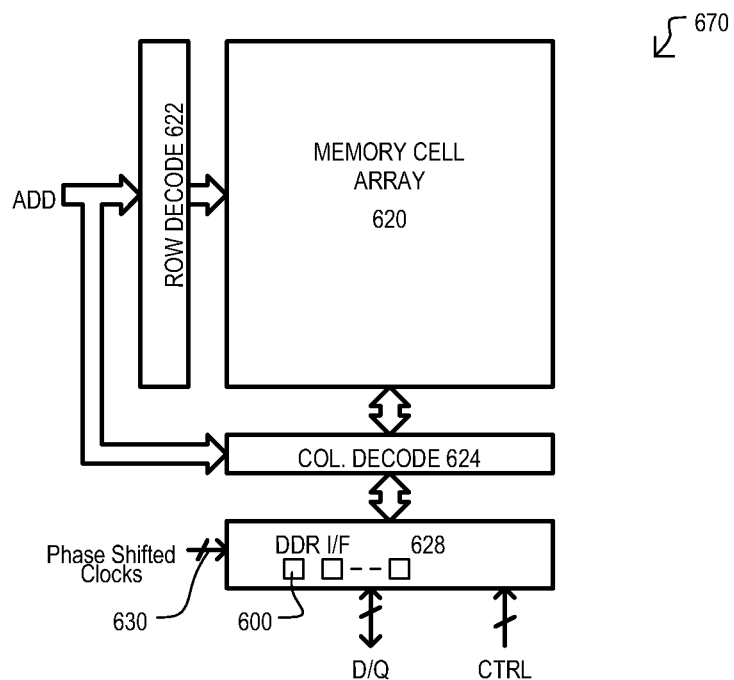
FIG. 6 is a block schematic diagram of a memory device according to an embodiment.

FIG. 6 is a block schematic diagram of a memory device 670 according to an embodiment. A memory device 670 can include a memory cell array 620, row decoder 622, column decoder 624, and memory interface 628. A memory cell array 620 can include any suitable memory cells, including but not limited to dynamic random access memory (DRAM) cells or static RAM (SRAM) cells. Row and column decoders (622/624) can select memory cells for accesses based on address values (ADD).

An interface 628 can provide access to memory cells of memory cell array 620 according to a predetermined timing and control convention. In the particular embodiment shown, an interface 628 can be a double data rate (DDR) interface, and include a number of data storing/sampling circuits (one shown as 600), as described herein, or equivalents. In the embodiment shown, interface 628 can receive phase shifted clocks 630, and utilize such clocks to sample data values at multiple times as described herein or equivalents. Data storing/sampling circuits (e.g., 600) can selectively store one of the sampled data values based on a previously sampled value.

In one embodiment, an interface 628 can store data with clock speeds of greater than 1 GHz, including up to 3.3 GHz.

It should be appreciated that reference throughout this specification to "one embodiment" or "an embodiment" means that a particular feature, structure or characteristic described in connection with the embodiment is included in at least one embodiment of the present invention. Therefore, it is emphasized and should be appreciated that two or more references to "an embodiment" or "one embodiment" or "an alternative embodiment" in various portions of this specification are not necessarily all referring to the same embodiment. Furthermore, the particular features, structures or characteristics may be combined as suitable in one or more embodiments of the invention.

Similarly, it should be appreciated that in the foregoing description of exemplary embodiments of the invention, various features of the invention are sometimes grouped together in a single embodiment, figure, or description thereof for the purpose of streamlining the disclosure aiding in the understanding of one or more of the various inventive aspects. This method of disclosure, however, is not to be interpreted as reflecting an intention that the claims require more features than are expressly recited in each claim. Rather, inventive aspects lie in less than all features of a single foregoing disclosed embodiment. Thus, the claims following the detailed description are hereby expressly incorporated into this detailed description, with each claim standing on its own as a separate embodiment of this invention.

What is claimed is:

1. A circuit, comprising:
   an input section configured to store a data signal in response to phase shifted clocks to generate a plurality of sample values;
   an output section configured to store one of the sample values; and
   a logic section configured to selectively output one of the sample values to the output section in response to the sample values and a previous sampled value stored in the output section, the logic section including
      a compare section configured to generate a mismatch indication when a sampled value differs from the previous sampled value stored by the output section that includes a plurality of logic gates, each having one input coupled to one of the sampled values, one input coupled to the previous sampled value stored by the output section, and an output that provides the mismatch indication, and
      a path switch section configured to couple a sample value to the output section in response to the mismatch indications that comprises a multiplexer (MUX) having inputs coupled to receive the sampled values, a MUX output coupled to the output section, and control inputs coupled to receive the mismatch indications.

2. The circuit of claim 1, wherein:
   the plurality of sample values includes
      a nominal sample value corresponding to a nominal clock,
      an early sample value corresponding to an early clock having a negative phase shift with respect to the nominal clock, and
      a delayed sample value corresponding to a delayed clock having a positive phase shift with respect to the nominal clock.

3. The circuit of claim 2, wherein:
   the input section includes
      a nominal clocked flip-flop (FF) coupled to receive the data signal at a data input and the nominal clock on a clock input, and configured to output the nominal sample value, and
      a delayed clocked FF coupled to receive the data signal at a data input and the delayed clock on a clock input, and configured to output the delayed sample value.

4. The circuit of claim 3, wherein:
   the input section further includes
      a data delay circuit configured to introduce a delay into the data signal to generate a delayed data signal, and
      an early clocked flip-flop (FF) coupled to receive the delayed data signal at a data input and the nominal clock on a clock input, and configured to output the early sample value.

5. The circuit of claim 3, wherein:
   the data signal and nominal clock both comprise complementary signals; and
   the nominal clocked FF and delayed clocked FF comprises differential FFs that generate differential output values.

6. The circuit of claim 3, wherein:
   the input section further includes
      a clock phase shift circuit configured to generate a shifted clock that is phase shifted forward with respect to the nominal clock, and
      an early clocked flip-flop (FF) coupled to receive the data signal at a data input and the shifted clock on a clock input, and configured to output the early sample value.

7. A data sampling circuit, comprising:
   a plurality of input circuits configured to sample a same data value to generate sample values, each input circuit sampling according to clock signals that are phase shifted with respect to one another by no more than one quarter of a clock cycle, the input circuits generating
      a nominal sample value corresponding to a nominal clock,
      an early sample value corresponding to an early clock having a negative phase shift with respect to the nominal clock, and
      a delayed sample value corresponding to a delayed clock having a positive phase shift with respect to the nominal clock; and the logic section is configured to compare the early sample value, nominal sample value, and late sample value to the previous sample value stored in the output circuit;

a logic section configured to output the early sample value if it differs from the previous sample value stored in the output circuit, to output the nominal sample value if it differs from the previous sample value, and the early sample value is the same as the previous sample value stored in the output circuit, and to output the delayed sample value if the nominal sample value and the early sample value are the same as the previous sample value stored in the output circuit; and an output circuit configured to store sample values from the logic section, and feedback a stored sample value to the logic section as the previous sample value.

8. The data sampling circuit of claim 7, wherein:
the input circuits generate the early sample value by sampling according to an early clock having a negative phase shift with respect to the nominal clock.

9. The data sampling circuit of claim 7, wherein:
the input circuits generate the early sample value by sampling a delayed data value according to the nominal clock.

10. The data sampling circuit of claim 7, wherein:
the input circuits generate the nominal sample value by sampling the data value according to the nominal clock, and generate the delayed sample value by sampling the data value according to a delayed clock having a positive phase shifted with respect to the nominal clock.

11. The data sampling circuit of claim 7, wherein:
the input circuits comprises double data rate (DDR) circuits that sample data values on rising and falling edges of the clock signals.

12. A method, comprising:
sampling a data value within an input section of a circuit with multiple phases of a clock signal to generate samples;

if an earliest sample is different than a previously stored data value, storing the earliest sample as a current stored data value in an output section of the circuit; and if the earliest sample is the same as the previously stored data value, and a next sample following the earliest sample is different than previously stored data, storing the next sample as the current stored data value in the output section of the circuit.

13. The method of claim 12, wherein:
sampling the data value includes
generating a nominal sample corresponding to a nominal clock,
generating an early sample corresponding to a time before the nominal sample, and
generating a late sample corresponding to a time after the nominal sample.

14. The method of claim 13, further including:
if the early sample is the same as the previously stored data value, and the nominal sample is different than the early sample, storing the nominal sample as the current stored data value; and
if the early and nominal samples are the same as the previously stored data value, storing the late sample as the current stored data value.

15. The method of claim 13, wherein:
generating the early sample includes sampling a delayed data value with the nominal clock.

16. The method of claim 15, wherein:
generating the early sample includes sampling the data value with an early clock having a negative phase shift with respect to the nominal clock.

17. The method of claim 12, wherein:
sampling the data value with multiple phases of the clock signal includes comparing complementary data values to complementary clock signals.

\* \* \* \* \*